S. SMYTH.
Grates for Stoves and Furnaces.

No. 208,767.  Patented Oct. 8, 1878.

Witnesses
Chas. H. Smith
Geo. T. Pinckney

Inventor
Samuel Smyth
per Lemuel W. Serrell
atty

UNITED STATES PATENT OFFICE.

SAMUEL SMYTH, OF PITTSTON, PENNSYLVANIA.

IMPROVEMENT IN GRATES FOR STOVES AND FURNACES.

Specification forming part of Letters Patent No. 208,767, dated October 8, 1878; application filed June 24, 1878.

*To all whom it may concern:*

Be it known that I, SAMUEL SMYTH, of Pittston, in the State of Pennsylvania, have invented an Improvement in Grate-Bars for Stoves and Furnaces, of which the following is a specification:

Grate-bars have been made so as to be revolved, and gearing has been used to connect the same.

Grate-bars have also been made prismatic, with projecting teeth at the angles, as in Letters Patent No. 30,074. The fire in these cases resting upon the bars is liable to heat and warp them. I make use of prismatic bars, in which the surfaces that support the fuel are composed of cross-pieces, projecting above the body of the bar sufficiently to allow the air to enter laterally from either side between the raised surfaces or transverse bars, and thereby the combustion is promoted and the grate-bar kept cooler and rendered durable.

Figure 1:
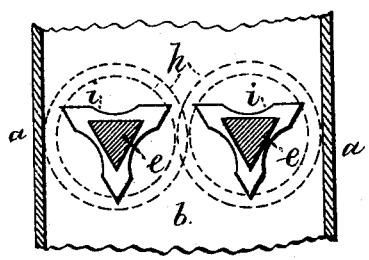
Figure 2:
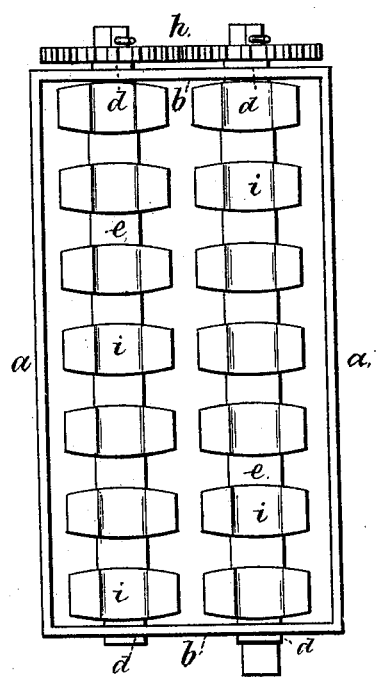

In the drawing, Figure 1 is a vertical section, showing a grate of two bars; and Fig. 2 is a plan of the same.

The portions $a$ $b$ represent the walls or frame around the grate. These are of any desired size and adapted to receive any number of my bars.

The grate-bars are each made with journals $d$ near each end, resting in bearings in the frame $a$ $b$. The body $e$ of the bar is polygonal, preferably triangular, and the bars have the open-work grate-surfaces $i$ $i$.

I make use of transverse bars, raised above the body $e$, and projecting across from one angle to the next, so that each side of the bar is of a form corresponding to a range of short bars or grates above the main bar $e$, and these bars should be all alike, so that the points or edges of the bars are adjacent to each other, and the whole forms a nearly flat grate-surface.

The wheels $h$ at the ends of the journals $d$ are made to gear together, so that all the bars can be turned at the same time and shaken for loosening the ashes, or revolved partially to bring a different grate-surface in contact with the fire, or for carrying down between the bars clinkers or other foreign substances; and it will be evident that in cases where the clinkers are too large to fall between the bars as they are revolved, the points of the bars will crack and break such clinkers. For this reason I prefer to have the projecting points, as shown; but there may be longitudinal connections between the cross-bars, if desired.

I claim as my invention—

The prismatic grate-bar having surfaces that support the fuel, and composed of cross-pieces projecting above the body of the bar sufficiently to allow the air to enter laterally from either side, and which cross-pieces also project at the angles of the bars, substantially as set forth.

Signed by me this 17th day of June, A. D. 1878.

SAMUEL SMYTH.

Witnesses:
 JNO. D. GREEN,
 WM. P. CONNELL.